Dec. 15, 1964   H. J. VENABLES III   3,161,070
INDEXING APPARATUS
Filed Jan. 28, 1964   2 Sheets-Sheet 1
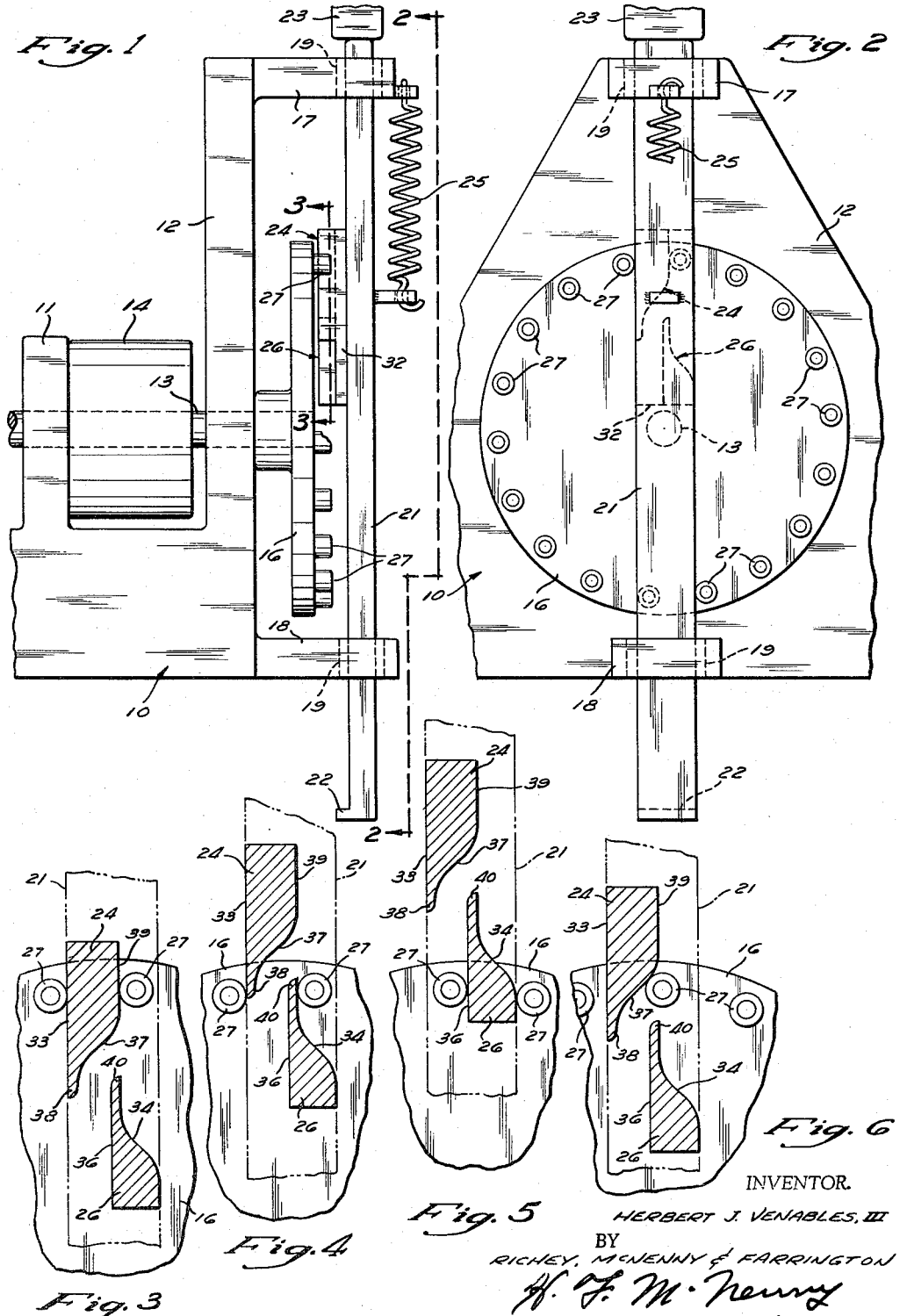
INVENTOR.
HERBERT J. VENABLES, III
BY
RICHEY, McNENNY & FARRINGTON
ATTORNEYS

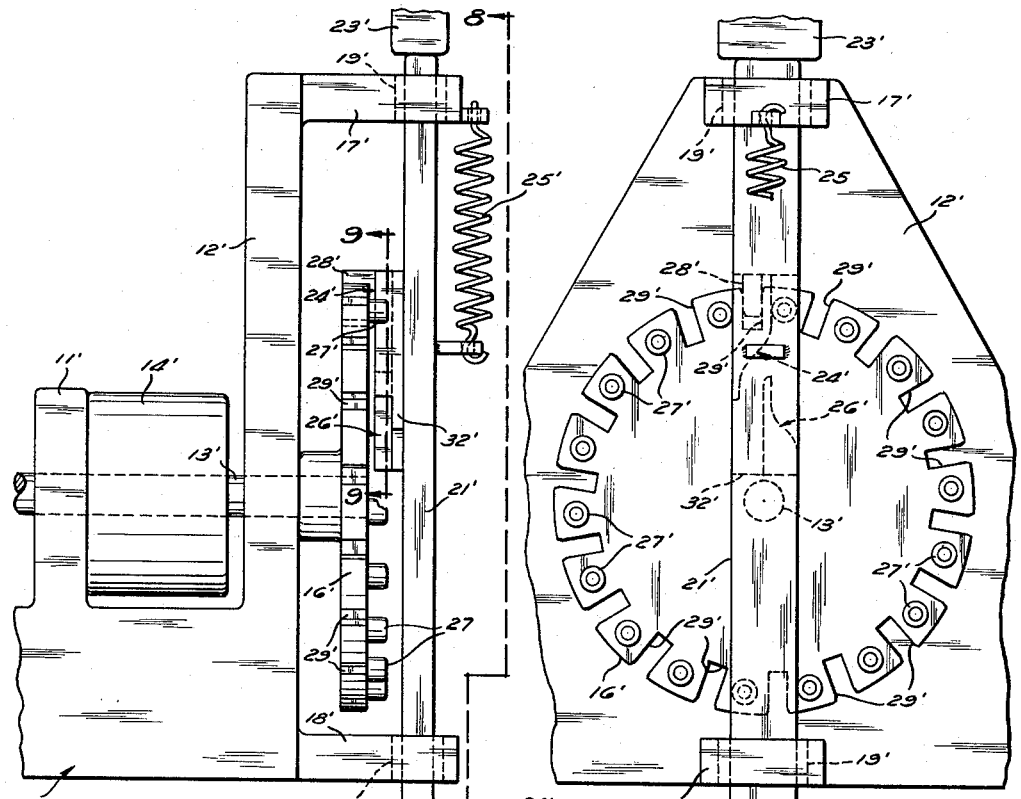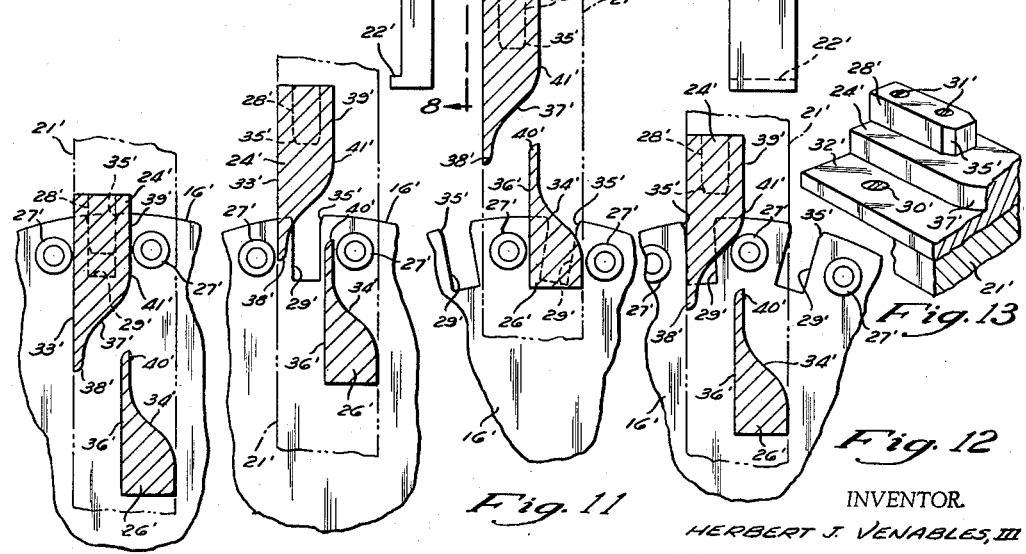

United States Patent Office 3,161,070
Patented Dec. 15, 1964

3,161,070
INDEXING APPARATUS
Herbert J. Venables III, Cleveland, Ohio, assignor to The Venables Machine & Tool Co., Cleveland, Ohio, a partnership
Filed Jan. 28, 1964, Ser. No. 340,643
10 Claims. (Cl. 74—129)

This invention relates generally to indexing devices and more particularly to an indexing device particularly suited for use with machine tools having reciprocating tool carriers or the like.

In many manufacturing operations a piece or a series of pieces are mounted for indexing through a series of positions in which the piece or pieces are held while manufacturing operations are performed thereon. Such devices may be utilized to turn a single piece through a number of sequential positions so that a similar operation may be performed at various points on the piece, or a series of pieces may be carried by a table, or the like, which is indexed to progressively position the pieces for machining operations.

An indexing mechanism incorporating this invention is suitable for use either with a single piece which must be rotated step by step through a series of positions or for an indexing table structure suitable for carrying a series of pieces. The mechanism is particularly suitable for operation by the reciprocating tool carrier present in many machines such as drill presses, punch presses, shapers and the like. The structure of the indexing mechanism is arranged so that it may be used with substantially any machine tool having a reciprocating tool carrier. However, it can also be utilized with a separate reciprocating drive if desired. Further, the mechanism is arranged so that it may be easily manufactured with a minimum of close tolerance machining while still providing a high degree of indexing accuracy. The structure is simple, having a minimum number of moving parts so that manufacturing costs and operational maintenance is low.

It is an important object of this invention to provide a novel and improved indexing mechanism particularly suited for use with machine tools having a reciprocating tool carrier wherein the need of separate indexing drive means is completely eliminated.

It is another object of this invention to provide a novel and improved indexing mechanism which is manufactured with a minimum of close tolerance machining while still providing a high degree of indexing accuracy.

It is still another object of this invention to provide a novel and improved indexing mechanism having a single reciprocating part which operates to produce both the indexing movement and locking of the indexing mechanism in the indexed position.

It is still another object of this invention to provide a novel and improved indexing mechanism operable by a single reciprocating drive.

It is still another object of this invention to provide a novel and improved indexing mechanism including a rotary indexing member and a reciprocating drive member provided with cams engaging pins or the like on the indexing element which cooperate with a one way brake to provide positive control during the indexing operations.

It is still another object of this invention to provide an indexing mechanism including cams to produce indexing movement mounted on a reciprocating carrier wherein a lock device for positive and accurate locking of the mechanism in the indexing positions is carried by the same reciprocating member as the cams and is operated by the same indexing movement.

Further objects and advantages will appear from the following description and drawings; wherein, FIGURE 1 is a side elevation illustrating one preferred form of an indexing mechanism incorporating this invention;

FIGURE 2 is an end elevation taken along 2—2 of FIGURE 1;

FIGURE 3 is an enlarged fragmentary view taken along 3—3 of FIGURE 1 illustrating the operation of the cam drive showing the elements in the indexed position in which the rotating indexing member is locked;

FIGURE 4 is a view similar to FIGURE 3 illustrating the indexing mechanism with the reciprocating member in an intermediate position in its upward stroke;

FIGURE 5 is a view similar to FIGURES 3 and 4 illustrating the elements when the reciprocating member is in the upper extreme of its movement.

FIGURE 6 is a view similar to FIGURES 3 through 5 illustrating the reciprocating member in an intermediate position in its downward stroke;

FIGURE 7 is a side elevation of a second embodiment of this invention provided with a locking member adapted to fit into associated grooves in the indexing member;

FIGURE 8 is an end view taken along 8—8 of FIGURE 7;

FIGURE 9 is a fragmentary section taken along 9—9 of FIGURE 7, illustrating the elements locked in one indexed position;

FIGURE 10 is a view similar to FIGURE 9 illustrating the indexing mechanism with the reciprocating member in an intermediate position of its upward stroke;

FIGURE 11 is a view similar to FIGURES 9 and 10 illustrating the reciprocating member in the upper extreme of its travel;

FIGURE 12 is a view similar to FIGURES 9 through 11 illustrating the reciprocating member in an intermediate position in its downward stroke; and FIGURE 13 is a fragmentary perspective view illustrating the locking member and its mounting on the cam carrying reciprocating member.

For purposes of simplification only the structure of the indexing mechanism per se is illustrated with the understanding that mounting flanges and workpiece holders are required. The work holder is mounted on the indexing member and is shaped to properly support the workpiece or workpieces being formed. The work holder, in some instances, will be a spindle to support tubular workpieces or may be a flat plate to support one or more workpieces symmetrically arranged with respect to the indexing axis or may be arranged in any other manner for indexing motion.

The illustrated form of this invention includes a base 10 formed with spaced bearing supports 11 and 12 on which an indexing shaft 13 is journaled. A one way brake 14 is mounted on the bearing support 11 and is connected to the shaft 13 to permit rotation of the shaft in one direction but prevent rotation in the opposite direction. Various types of one way brakes are well known in the art and the clutch 14 may be of any suitable type. One type of clutch which may be used is known in the art as a sprag overriding clutch. In the illustrated embodiment the brake permits clockwise rotation, as viewed in FIGURE 2, but prevents anti-clockwise rotation.

An indexing plate 16 is mounted on the shaft 13 adjacent to the support 12 and is fixed against rotation relative thereto so that indexing rotation of the plate 16 produces indexing rotation of the shaft 13.

The base 10 is formed with a pair of spaced laterally extending arms 17 and 18, each provided with a bearing 19 which guides a reciprocating cam support 21 for reciprocating movement along a plane which, in the illustrated embodiments, is perpendicular to the axis of the shaft 13. A stop 22 on the cam support 21 is positioned to engage the support arm 18 when the cam support reaches the upper extreme of its travel. A spring 25 is connected between the cam support 21 and the support arm 17 to bias the cam support toward its upward extreme position.

The upper end of the cam support 21 is positioned for engagement by an operating abutment 23 carried by any suitable reciprocating member on the machine tool on which the indexing mechanism is mounted. As an example, when the indexing mechanism is used in conjunction with a punch press the abutment 23 would be mounted on the tool slide in such a position that it would engage the cam support 21 and move it against the action of the spring 25 to the position illustrated in FIGURES 1 and 2 when the tool slide reaches its forward extreme position in its travel and would move upward away from the cam support 21 as the tool slide retracts.

Referring now to FIGURE 2, a pair of cams 24 and 26 are mounted on the cam support 21 for sequential engagement with cam rollers 27 symmetrically mounted around the plate 16 with the number of rollers equaling the number of required indexing positions. In the illustrated structure eighteen rollers are provided and the indexing mechanism provides eighteen indexing positions. The cams 24 and 26, in cooperation with the rollers 27, function to rotate the indexing plate 16 in a clockwise direction, as viewed in FIGURE 2, through one-eighteenth of a revolution each time the cam support is reciprocated. Preferably, the cams 24 and 26 are machined on a single cam member 32 which is fastened to the cam support 21 by bolt fasteners so that the cams may be removed or replaced and will always be properly positioned with respect to each other.

The operation of the mechanism is best understood by referring to FIGURES 3 through 6. In FIGURE 3 the elements are illustrated when the cam support 21 and the cams are in the lower extreme position of movement which occurs when the abutment 23 presses the cam support 21 downward against the action of the spring 25. In this position the indexing plate 16 is in one of the indexed positions.

As the abutment 23 moves back allowing the spring 25 to move the cam support 21 upward, the elements move to the position illustrated in FIGURE 4, which is an arbitrary point midway in the upward stroke. The cam 24 is provided with a straight side 33 on the left as viewed in FIGURES 2 through 6. This straight side 33 is engaged by one of the rollers 27 to prevent clockwise movement of the plate. Anti-clockwise movement is prevented by the one way brake 14.

When the elements reach the position of FIGURE 4 the right roller of the pair of rollers engages the forward or upward end 40 of the cam 26 before the left roller moves out of engagement with the straight side 33. During this portion of movement of the cam support 21 the indexing plate does not move.

Continued movement of the cam support 21 to the position of FIGURE 5 causes the right roller to roll up along the camming surface 34 which is preferably formed with a harmonic curve for smooth operation. This causes the indexing plate to rotate in a clockwise direction through an angle approximately equal to one half of the angular spacing between adjacent indexed positions. The lower end of the cam 24 is above the camming surface so the cam 24 is clear of the rollers during this movement. When the support 21 reaches its uppermost position the left roller 27 engages the straight wall 36 on the cam 26. The width of the cam 26 at its lower end is substantially equal to the spacing between adjacent rollers so the indexing plate is locked in the position illustrated.

The cam support 21 remains in the position of FIGURE 5 until it is again engaged by the abutment 23 on the machine tool and pressed downward against the action of the spring. When this occurs the left roller engaging the straight wall 36 on the cam 26 rolls along the wall until it moves into engagement with the lower end 38 on the cam 24. Here again, the one way brake 14 prevents anti-clockwise movement and maintains the left cam roller 27 in engagement with the wall 36. Also, the upper end 40 of the cam 26 extends above the lower end 38 of the cam 24, so positive control is maintained. Further downward movement of the cam support causes a cam surface 37 to engage the left roller causing the indexing plate 16 to again rotate in a clockwise direction until the next roller 27 moves into engagement with the left straight wall 33 of the cam 24. Here again the cam surface 37 is preferably formed as a harmonic curve for smooth operation.

The cam 24 is provided with a straight side wall 39 parallel to the side wall 33 which extends a substantial distance to provide a dwell portion on the cam 24. The spacing between the walls 33 and 39 is equal to the spacing between adjacent rollers 27 so that the indexing plate 16 is positively retained in the indexed position. The length of the wall 39 is sufficiently long to allow the continued downward movement of the abutment 23 during the operation of the machine tool after the indexing plate has moved to an indexing position.

Since the locking and rotation of the indexing plate is created with a single reciprocating movement of the cam support 21 structural simplicity is provided. Also, the various elements of the structure are arranged so that a minimum of close tolerance manufacturing is required. Still further, the use of the reciprocation of the tool slide of the associated tool eliminates the necessity of separate indexing drives and synchronizing control systems. With this structure the indexing mechanism is always synchronized with the associated tool operation.

In some instances where increased accuracy is desired a locking member may be provided which is carried by the cam support and cooperates with notches formed in the indexing plate to lock the indexing plate in the indexed position. Such a structure is illustrated in FIGURES 7 through 13. In this second embodiment a prime (′) is added to indicate that the reference numerals refer to the second embodiment but the same number are used to designate parts which are similar in the two embodiments.

The indexing plate 16′ is mounted on the indexing shaft 13′ which is in turn journaled in the spaced bearing supports 11′ and 12′. The cam support 21′ is again supported on lateral arms 17′ and 18′ for reciprocating movement along a plane perpendicular to the axis of the indexing shaft 13′. A lock member 28′ is mounted on the cam 24′ by threaded fasteners 31′ and is proportioned to fit into indexing slots 29′ when the cam support 21′ moves to its lower position illustrated in FIGURES 7, 8 and 9.

An indexing notch 29′ is provided in the indexing plate 16′ between each pair of rollers 27′ with one notch for each indexing position. The side walls of each notch 29′, when in position to receive the locking member 28′, and the side walls of the locking member 28′ are all parallel to the line of movement of the cam support 21′. Also the width of the locking member 28′ and the notches 29′ are equal. Therefore, the indexing member 16′ is held fixed in each indexing position when the locking member 28′ moves into the associated notch. The various elements are proportioned so that the notches have a depth sufficiently long to hold the indexing member 16′ in the indexing position as the cam support 21' continues to move during the work stroke of the machine and so that the locking member 28' does not engage the lower end of the associated notch. Both the notches 29' and the lock member 28' are formed with chamfers 35' at their ends to facilitate the smooth entry of the lock member into the notches and to move the indexing plate to the exact indexing position.

The beginning of the side wall 39' at the point 41' where it intersects the camming surface 37' is spaced below the end of the locking member 28' by a distance at least equal to the spacing between the axis of the rollers 27' and the upper end of the associated notches 29' so that the indexing plate 16' will have moved to its indexing position before the locking member 28' begins to enter the associated notch. This insures smooth entry of the locking member into the notch. In this second embodiment wherein the locking member 28' is utilized, it is not necessary to form the cams 26' with extreme accuracy nor is it necessary to locate the cam rollers 27' with extreme accuracy since the accurate positioning is provided by the locking member.

In some instances the operating abutment 23 cannot be conveniently positioned on the tool carrier or tool slide and in such instances the abutment may be operated by other moving parts on the associated machine. Also, if desired, a separate actuator such as an air cylinder may be used to move the cam support.

Although preferred embodiments of this invention are illustrated, it is to be understood that various modifications and rearrangements of parts may be resorted to without departing from the scope of the invention as defined in the following claims.

What is claimed is:

1. An indexing device comprising a base, an indexing member mounted on said base for indexing motion, brake means connected to said indexing member allowing motion thereof only in one direction, a slide mounted for reciprocation relative to said base, a plurality of spaced cam followers connected to said indexing member, cam means on said slide shaped to sequentially engage said cam followers as said slide reciprocates and cause step by step motion of said indexing member in said one direction, said cam means being formed with a dwell portion having opposed sides parallel to the line of movement of said slide, said opposed sides being spaced apart a distance proportioned to engage opposed sections of said followers and provide substantial locking of said member in predetermined indexed positions, said camming means permitting movement of said indexing member in a direction opposite said one direction during intermediate portions of said reciprocation which movement is prevented by said brake means.

2. An indexing device comprising a base, an indexing member mounted on said base for indexing motion, brake means connected to said indexing member allowing motion thereof only in one indexing direction, a slide mounted for reciprocation relative to said base, spring means urging said slide in one direction, an abutment operable to move said slide against said spring in the opposite direction, a plurality of spaced cam pins connected to said indexing member, a pair of adjacent opposed cams on said slide shaped to sequentially engage each of cam pins as said slide reciprocates and cause step by step motion of said indexing member in said one direction, one of said cams engaging a given pin upon movement of said slide in said one direction and the other of said cams engaging said given pin upon movement of said slide in said opposite direction at least one of said cams being formed with a dwell portion having opposed sides parallel to the line of movement of said slide, said opposed sides being spaced apart a distance proportioned to engage opposed sections of said pins and provide substantial locking of said member in predetermined indexed positions, said cams permitting movement of said indexing member in a direction opposite said indexing direction during intermediate portions of the reciprocation of said slide which movement is prevented by said brake means.

3. An indexing device comprising a base, an indexing member journaled on said base for rotation about an axis, a one way brake connected to said indexing member allowing rotation thereof only in one direction, a slide journaled on said base for reciprocation relative thereto, an indexing plate mounted on said indexing member, a plurality of cam pins symmetrically located around said plate, a pair of opposed cams on said slide shaped to sequentially engage said cam pins as said slide reciprocates and cause step by step rotation of said indexing member in said one direction, at least one of said cams being formed with a dwell portion having opposed sides parallel to the line of movement of said slide, said opposed sides being spaced apart a distance proportioned to engage opposed sections of said pins and provide substantial locking of said plate in predetermined indexed positions as said slide approaches one extreme of its reciprocating movement, and cooperating opposed walls on said slide and plate parallel to the line of movement of said slide when said plate is in indexed positions mating to lock said plate in such index positions when said slide moves toward said one extreme of its reciprocating movement, said opposed cams permitting movement of said indexing member in a direction opposite said one direction during intermediate portions of the reciprocation of said slide which movement is prevented by said one way brake.

4. An indexing mechanism for use with a machine tool having a reciprocating member timed with the machines cycle comprising a base, an indexing shaft journaled on said base and adapted to support a workpiece for forming by said machine tool, brake means connected to said shaft permitting rotation thereof only in one direction, a plate fixed to said shaft having a face perpendicular to the axis of rotation of said shaft, a slide on said base reciprocable parallel to said face between first and second positions, a spring connected to said slide biasing it to said first position, said slide being cyclicly movable by said reciprocating member to said second position when said machine operates to form the workpiece, cam means on said slide, a plurality of cam followers on the face of said plate symmetrically positioned around the axis of rotation of said shaft, said cam and cam followers operating to rotate said plate and shaft in said one direction between adjacent indexing positions each time said slide moves from said second position to said first position and back to said second position, said cam means permitting movement of said indexing shaft in a direction opposite said one direction during portions of the reciprocation of said slide which movement is prevented by said brake means.

5. An indexing mechanism for use with a machine tool having a reciprocating member timed with the machines cycle comprising a base, an indexing shaft journaled on said base and adapted to support a workpiece for forming by said machine tool, brake means connected to said shaft permitting rotation thereof only in one direction, a plate fixed to said shaft having a face perpendicular to the axis of rotation of said shaft, a slide on said base reciprocable parallel to said face between first and second positions, a spring connected to said slide biasing it to said first position, said slide being cyclicly movable by said reciprocating member to said second position when said machine operates to form the workpiece, a pair of cooperating cams on said slide having adjacent opposed camming surfaces, a plurality of cam followers on the face of said plate symmetrically positioned around the axis of rotation of said shaft said cam surfaces sequentially engaging a given cam follower operating to rotate said plate and shaft in said one direction between adjacent indexing positions each time said slide moves from said second position to said first position and back to said second position, one of said cams being formed to move said plate to an indexed position and maintain it in such position when said slide is between an intermediate position spaced from said second position and said second position, said cooperating cams permitting movement of said indexing member in a direction opposite said one direction during portions of the reciprocation of said slide which movement is prevented by said brake means.

6. An indexing mechanism for use with machine tools having a reciprocating member movable in timed relationship to the operation of the machine comprising a base, an indexing shaft journaled for rotation on said base adapted to support and index a workpiece, a one way brake connected to permit rotation of said shaft only in one direction, a slide reciprocable in a plane substantially perpendicular to the axis of rotation of said shaft, a plurality of cam rollers carried by said shaft and positioned symmetrically around the axis of rotation thereof, a pair of opposed cams on said slide each formed with a straight side, a curved camming surface and a dwell portion parallel to and spaced from said straight side a distance substantially equal to the spacing between adjacent rollers, movement of said slide to one extreme of its travel positioning the dwell portion of one cam in engagement with said rollers and movement of said slide to the other extreme position of its travel moving the dwell portion of the other of said cams into engagement with said rollers, reciprocation of said slide in response to movement of said reciprocating member producing indexing movement of said shaft in said one direction, the curved camming surface of one cam being substantially adjacent to and opposed to the curved camming surface of the other of said cams whereby a given one of said rollers is engaged by one curved camming surface upon movement of said slide toward one extreme position and subsequently by the other of said camming surfaces upon movement of said slide toward said other extreme position, said opposed cams permitting rotation of said shaft in a direction opposite said one direction during portions of the reciprocation of said slide which movement is prevented by said overriding brake.

7. In combination a base, tool carrier means reciprocable relative to said base, an indexing shaft journaled for rotation on said base adapted to support and index a workpiece, a one way brake connected to permit rotation of said shaft only in one direction, a slide reciprocable in a plane substantially perpendicular to the axis of rotation of said shaft, a plurality of cam rollers carried by said shaft and positioned symmetrically around the axis of rotation thereof, a pair of opposed cams on said slide each formed with a straight side, a curved camming surface and a dwell portion parallel to and spaced from said straight side, said dwell portions being spaced from the associated straight side a distance substantially equal to the spacing between adjacent rollers, movement of said slide to one extreme of its travel positioning the dwell portion of one cam in engagement with said rollers and movement of said slide to the other extreme position of its travel moving the dwell portion of the other of said cams into engagement with said rollers, reciprocation of said slide in response to movement of said reciprocating tool carrier means being adapted to produce movement of said shaft in said one direction to indexed positions before the workpiece is worked by a tool carried by said tool carrier means, said opposed cams permitting rotation of said shaft in a direction opposite said one direction during portions of the reciprocation of said slide which movement is prevented by said overriding brake.

8. An indexing mechanism for use with machine tools having a reciprocating member movable in timed relationship to the operation of the machine comprising a base, an indexing shaft journaled for rotation on said base adapted to support and index a workpiece, a one way brake connected to permit rotation of said shaft only in one direction, a slide reciprocable in a plane substantially perpendicular to the axis of rotation of said shaft, a plurality of cam rollers carried by said shaft and positioned symmetrically around the axis of rotation thereof, a pair of opposed cams on said slide each formed with a straight side, a curved camming surface and a dwell portion parallel to and spaced from said straight side, said dwell portions being spaced from the associated straight side a distance substantially equal to the spacing between adjacent rollers, movement of said slide to one extreme of its travel positioning the dwell portion of one cam in engagement with said rollers and movement of said slide to the other extreme position of its travel moving the dwell portion of the other of said cams into engagement with said rollers, reciprocation of said slide in response to movement of said reciprocating member producing indexing movement of said shaft in said one direction, said opposed cams permitting rotation of said shaft in the direction opposite said one direction during portions of the reciprocation of said slide which rotation is prevented by said overriding brake, and lock means on said slide and shaft interengaging to accurately position said shaft in each indexed position after said rollers engage one dwell portion and before said slide reaches the extreme position of its reciprocating movement.

9. An indexing mechanism for use with machine tools having a reciprocating member movable in timed relationship to the operation of the machine comprising a base, an indexing shaft journaled for rotation on said base adapted to support and index a workpiece, a one way brake connected to permit rotation of said shaft only in one direction, a slide reciprocable in a plane substantially perpendicular to the axis of rotation of said shaft, a plurality of cam rollers carried by said shaft and positioned symmetrically around the axis of rotation thereof, a pair of opposed cams on said slide each formed with a straight side, a curved camming surface substantially adjacent to and opposite the camming surface on the other of said cams and a dwell portion parallel to and spaced from said straight side, said dwell portions being spaced from the associated straight side a distance substantially equal to the spacing between adjacent rollers, movement of said slide to one extreme of its travel positioning the dwell portion of one cam in engagement with said rollers and movement of said slide to the other extreme position of its travel moving the dwell portion of the other of said cams into engagement with said rollers, reciprocation of said slide in response to movement of said reciprocating member producing indexing movement of said shaft in said one direction, said opposed cams permitting rotation of said indexing shaft in a direction opposite said one direction during portions of the reciprocation of said slide which rotation is prevented by said one way brake, and lock means on said slide and shaft interengaging to accurately position said shaft in each indexed position after said rollers engage one dwell portion and before said slide reaches the extreme position of its reciprocating movement, said lock means including a radially extending notch between each cam roller providing parallel side walls and a chamfered entrance, and a mating projecting on said slide having opposed parallel walls mating with the walls of said notches and a chamfered end.

10. An indexing device comprising a base, an indexing member mounted on said base for indexing motion, brake means connected to said indexing member allowing motion thereof only in one direction, a slide mounted for reciprocation relative to said base between forward and rearward positions, a plurality of spaced cam followers connected to said indexing member, cam means on said slide having adjacent opposed camming surfaces, one camming surface being operable to engage a given cam follower during movement of said slide toward said forward position and the other of said camming surfaces thereafter engaging said given cam follower on the subsequent movement of said slide toward said rearward position, said camming surfaces producing step-by-step motion of said indexing member in said one direction each time said slide moves between said forward and rearward positions, said cam means being formed with a dwell portion having opposed sides parallel to the line of movement of said slide, said opposed sides being spaced apart a distance proportioned to engage opposed sections of said followers and provide substantially locking of said member in predetermined indexed positions, said camming means permitting movement of said indexing member in a direction opposite said one direction during an intermediate portion of the reciprocation of said slide which movement is prevented by said brake means.

References Cited by the Examiner

UNITED STATES PATENTS

| | | | |
|---|---|---|---|
| 277,849 | 5/83 | Park | 74—88 |
| 510,557 | 12/93 | Saati | 74—118 |
| 795,095 | 7/05 | Benoit et al. | 74—125 |
| 1,167,179 | 1/16 | Hires | 74—129 |
| 1,229,301 | 6/17 | Loe | 74—88 |
| 2,547,533 | 4/51 | Mills | 74—129 X |
| 2,784,599 | 3/57 | Moulin | 74—84 |
| 2,808,033 | 10/57 | Geier | 74—129 X |
| 2,923,206 | 2/60 | Kovac | 74—128 X |

FOREIGN PATENTS

| | | |
|---|---|---|
| 438 | 12/92 | Great Britain. |
| 380,938 | 6/40 | Italy. |

BROUGHTON G. DURHAM, *Primary Examiner.*